US011841300B2

(12) United States Patent
Decker

(10) Patent No.: US 11,841,300 B2
(45) Date of Patent: Dec. 12, 2023

(54) FILL PROBE ATTACHMENT WITH ELONGATED GAS-GUIDING ELEMENT

(71) Applicant: INFICON GmbH, Cologne (DE)

(72) Inventor: Silvio Decker, Cologne (DE)

(73) Assignee: INFICON GmbH, Cologne (DE)

( * ) Notice: Subject to any disclaimer, the term of this patent is extended or adjusted under 35 U.S.C. 154(b) by 210 days.

(21) Appl. No.: 16/332,597

(22) PCT Filed: Sep. 18, 2017

(86) PCT No.: PCT/EP2017/073404
§ 371 (c)(1),
(2) Date: Mar. 12, 2019

(87) PCT Pub. No.: WO2018/050879
PCT Pub. Date: Mar. 22, 2018

(65) Prior Publication Data
US 2020/0256771 A1    Aug. 13, 2020

(30) Foreign Application Priority Data

Sep. 19, 2016   (DE) .................. 10 2016 217 891.1

(51) Int. Cl.
*G01N 1/24* (2006.01)
*G01N 1/22* (2006.01)
*G01M 3/20* (2006.01)

(52) U.S. Cl.
CPC .............. *G01N 1/24* (2013.01); *G01M 3/205* (2013.01); *G01N 2001/2285* (2013.01)

(58) Field of Classification Search
CPC .................. G01N 1/24; G01N 2001/2285
See application file for complete search history.

(56) References Cited

U.S. PATENT DOCUMENTS

| 4,576,038 A * | 3/1986 | Dixon | G01M 3/04 73/40.7 |
|---|---|---|---|
| 4,961,916 A * | 10/1990 | Lesage | B01D 53/30 422/109 |
| 2003/0159495 A1 * | 8/2003 | Cardinale | G01N 1/24 73/23.2 |

(Continued)

FOREIGN PATENT DOCUMENTS

| CN | 103759898 | * | 4/2014 |
| CN | 103759898 A | * | 4/2014 |

(Continued)

OTHER PUBLICATIONS

CN103759898-English (Year: 2014).*
JP2005204690A-English (Year: 2005).*
CN-204855442-U-English (Year: 2015).*

*Primary Examiner* — Kristina M Deherrera
*Assistant Examiner* — Fatemeh Esfandiari Nia
(74) *Attorney, Agent, or Firm* — The Webb Law Firm

(57) ABSTRACT

A sniffer probe for a gas analyzer is provided herein, the sniffer probe designed to suction gas and can be connected to the gas analyzer and includes a sniffer tip with a suction opening, such that gas is suctioned through the suction opening along a central perpendicular to the suction opening, and the sniffer tip has at least one elongate gas-guiding element, which is arranged substantially parallel to the central perpendicular and distally protrudes beyond the suction opening.

7 Claims, 2 Drawing Sheets

(56) References Cited

U.S. PATENT DOCUMENTS

| | | | |
|---|---|---|---|
| 2007/0256474 A1* | 11/2007 | Paakkanen | B01D 63/02 73/23.37 |
| 2008/0184782 A1* | 8/2008 | Bohm | G01M 3/205 73/40.7 |
| 2010/0326169 A1* | 12/2010 | Grosse-Bley | G01M 3/202 73/40.7 |
| 2012/0036920 A1 | 2/2012 | Pailloux et al. | |
| 2012/0048001 A1 | 3/2012 | Pawlyk | |
| 2016/0202138 A1 | 7/2016 | Wetzig | |
| 2018/0328808 A1* | 11/2018 | Jourdan | G01N 1/24 |

FOREIGN PATENT DOCUMENTS

| | | | |
|---|---|---|---|
| CN | 103759898 A | | 4/2014 |
| CN | 204855442 U | * | 12/2015 |
| CN | 103759898 B | * | 11/2016 |
| DE | 19813432 A1 | | 9/1999 |
| DE | 102015001443 B3 | | 5/2016 |
| EP | 2485030 A1 | | 8/2012 |
| GB | 2072852 A | | 10/1981 |
| JP | S6088339 A | | 5/1985 |
| JP | S61246645 A | | 11/1986 |
| JP | H989707 A | | 4/1997 |
| JP | 2005204690 A | * | 8/2005 |
| JP | 201060410 A | | 3/2010 |
| JP | 2011511294 A | | 4/2011 |
| JP | 2016529502 A | | 9/2016 |
| WO | 2015028336 A1 | | 3/2015 |

\* cited by examiner

FILL PROBE ATTACHMENT WITH ELONGATED GAS-GUIDING ELEMENT

CROSS-REFERENCE TO RELATED APPLICATIONS

This application is the United States national phase of International Application No. PCT/EP2017/073404 filed Sep. 18, 2017, and claims priority to German Patent Application No. 10 2016 217 891.1 filed Sep. 19, 2016, the disclosures of which are hereby incorporated by reference in their entirety.

BACKGROUND OF THE INVENTION

The disclosure relates to a sniffer probe of a gas analyzer configured to draw gas, as well as to a sniffer attachment for such a sniffer probe.

For generating a vacuum, a gas analyzer is provided with a vacuum pump to draw gas into the vacuum. The gas drawn in is analyzed in order to identify at least one component of the gas drawn in. The vacuum pump of the gas analyzer is connected with the sniffer probe, typically via an elongated flexible hose, so as to be able to guide the sniffer probe in the target region. The gas is drawn in through the intake opening of the sniffer tip along a perpendicular bisector of the intake opening, the intake opening being provided distally on the sniffer probe. Such gas analyzers are typically used for leak detection, wherein the sniffer probe is most often guided manually over a region to be tested for a possible leak. The sniffer probe may, for example, be guided over a test object in which a test gas is used to pressurize the object with respect to the surrounding atmosphere, so as to detect test gas escaping through a possible leak.

It is a basic difficulty in the detection of leaks that, for detecting a leak, it is conventionally desired that a strong flow of the gas flow drawn in through the sniffer probe is obtained already at a great distance. However, the greater the gas flow drawn in, the lower is the concentration of the detected test gas in the gas flow drawn in and the lower is the detection limit for the test gas. In addition, air flows transversal to the intake direction of the sniffer probe may have the effect that a part of the test gas escaping from a leak is carried away from the sniffer tip and is not detected by the gas analyzer. This effect reduces the detection limit for the test gas the more, the greater the distance is between a leak and the sniffer tip.

It is an object of the present disclosure to provide an improved sniffer probe and an improved sniffer attachment. The object is achieved with the features of claims 1 and 2.

SUMMARY OF THE INVENTION

The sniffer probe is provided with at least one elongated gas-guiding element. As an alternative, a sniffer attachment is provided which is adapted to be mounted on the sniffer probe and is provided with the at least one elongated element. With respect to the elongated element, gas-guiding means that air or gas flows transversal to the opening area of the intake opening, i.e. perpendicular to the perpendicular bisector of the intake opening, are affected by the elongated element. This is to avoid that such transversal flows carry test gas away from the intake opening or prevent the same from being drawn into the intake opening. Here, the elongated element is arranged substantially in parallel with the perpendicular bisector of the intake opening along which the gas is drawn in, so that the intake of the gas through the intake opening along the perpendicular bisector is compromised as little as possible. As used herein, substantially refers to an inclined arrangement in an angular range of up to 20 degrees, preferably up to 10 degrees and particularly preferred up to 5 degrees with respect to the parallel line. It is preferred that the elongated element affects transversal flows more than gas flows along the perpendicular bisector. The elongated element may also serve to reduce gas turbulences. This results in the advantage that the proportion of test gas in the gas flow drawn in is increased due to the reduced transversal flows and that the detection limit for the detection of test gas in the gas flow drawn in is lowered.

The elongated element is an element whose longitudinal dimension along the perpendicular bisector is larger than its width or depth transverse to the perpendicular bisector. The elongated element may be a two-dimensional sheet-like element whose depth is significantly smaller than its width, the width being smaller than its length. As an alternative, the element may be a fiber-like cylindrical element. This may, for example, be a fiber with a round cross section. Preferably, a plurality of elongated elements of the above described kind is arranged adjacent the intake opening so as to form a barrier to transversal flows. Advantageously, the elongated elements are distributed around the intake opening, e.g. in an annular manner. Thus, transversal flows from any possible direction transverse to the perpendicular bisector of the plane of the intake opening are affected, while the gas flow in the longitudinal direction along the perpendicular bisector is affected only slightly. The elongated elements are preferably designed to be elastically resilient. In the case of elongated fibers, this results a paintbrush-like structure for preventing transversal flows and for direction the gas flow along the fibers.

The elongated element extends distally beyond the intake opening, so that the gas drawn in flows past the elongated element before it reaches the intake opening. In the case of elastically resilient elongated elements or a resilient elastic element, the same may also serve as an indicator for adjusting and maintaining a suitable distance from the surface of the test object being sniffed. The length of the elongated element protruding distally beyond the intake opening should correspond to the optimal distance between the intake opening and the surface to be sniffed. Upon contact between the distal ends of the elongated elements and the surface sniffed, the elongated elements provide a haptically noticeable resistance.

It is conceivable to provide the distal end of at least one elongated element with a touch-sensitive sensor which, upon contact with the surface to be sniffed, generates a signal that indicates that the sniffer tip maintains the correct distance from the test object. The signal may be generated in a manner known per se, e.g. electronically, and be transmitted to the gas analyzer.

In another embodiment it is conceivable that the elongated gas-guiding element is made of a gas-permeable, e.g. sponge-like material. Advantageously, the gas permeability is greater in the longitudinal direction of the elongated element, i.e. in the gas intake direction parallel to the perpendicular bisector of the intake opening plane, than it is in the direction transversal to the longitudinal direction, so as to affect transversal flows of the gas more than longitudinal flows. The gas-permeable material of the elongated element may cover the intake opening so that the drawn gas is drawn in through the material. In this case, it is particularly advantageous if the gas permeability is greater in the longitudinal direction than in the transversal direction. As an alternative, the elongated element may also be arranged adjacent the intake opening, e.g. in form of a shield shielding off transversal flows in the manner of a windshield. An arrangement of a plurality of elongated elements of a gas-permeable material of the above described type is also conceivable.

BRIEF DESCRIPTION OF THE DRAWINGS

The following is a detailed explanation of embodiments of the disclosure with reference to the Figures. In the Figures.

DESCRIPTION OF THE INVENTION

Figure 2:
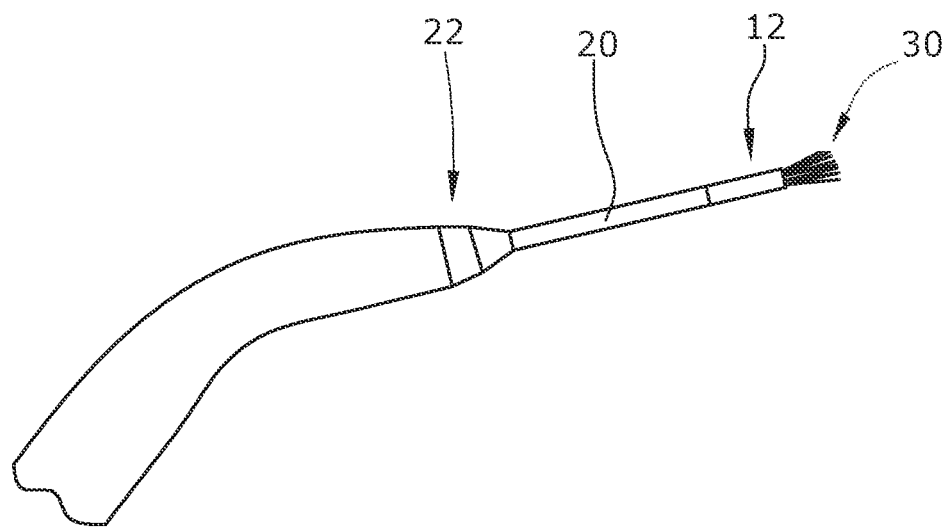
FIG. 2 is an illustration of a sniffer probe with the sniffer attachment of FIG. 1.

The sniffer attachment 12 of the first embodiment has a cylindrical housing 14 provided with a flow channel for the gas flow drawn in, the flow channel extending centrally through the housing 14. At the proximal, i.e. the downstream end 18, seen in the gas flow direction of the gas flow drawn in, the sniffer attachment 12 may be set on the sniffer tip 20 of a sniffer probe 22, as illustrated in FIG. 2. For this purpose, the sniffer attachment 12 and the sniffer probe 22 can be provided with complementary interlocking connector elements not illustrated in the Figures.

At the distal end 24 opposite the proximal end 18, the sniffer attachment 12 is provided with a second intake opening 26 opening into the gas flow channel 16. At least for the greater part, the gas is drawn in through the second intake opening 26 along the perpendicular bisector 28, i.e. in an intake direction parallel to a straight line arranged perpendicular to the surface of the second intake opening 26 and extending through the centre of the second intake opening 26.

The distal end 24 is provided with a plurality of fiber-like elongated elements 30 which protrude as thin fibers in a paintbrush-like manner from the distal end 24 and extend distally.

Figure 1:
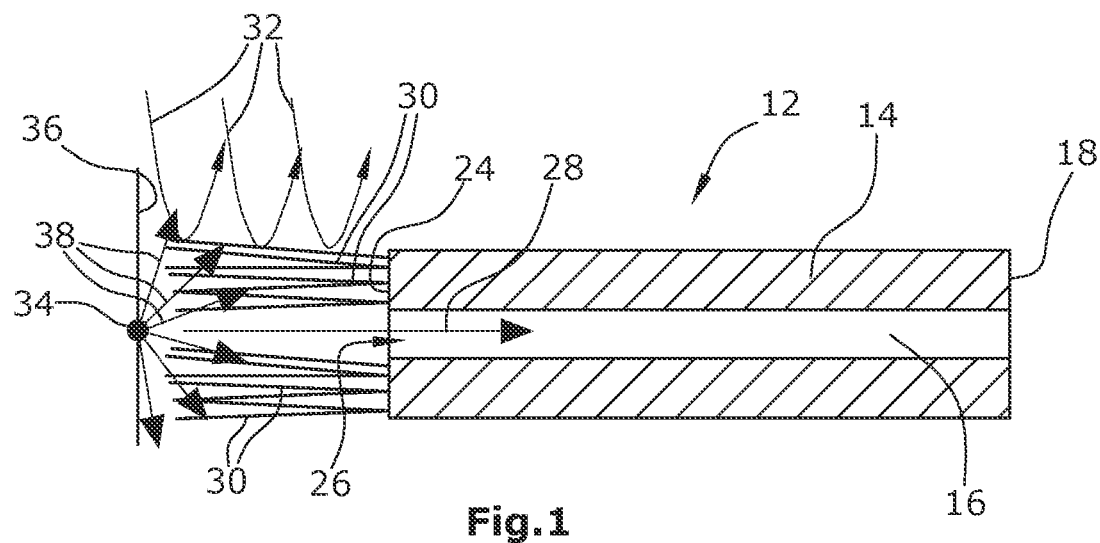
FIG. 1 is a longitudinal section through a sniffer attachment (first embodiment)
Figure 3:
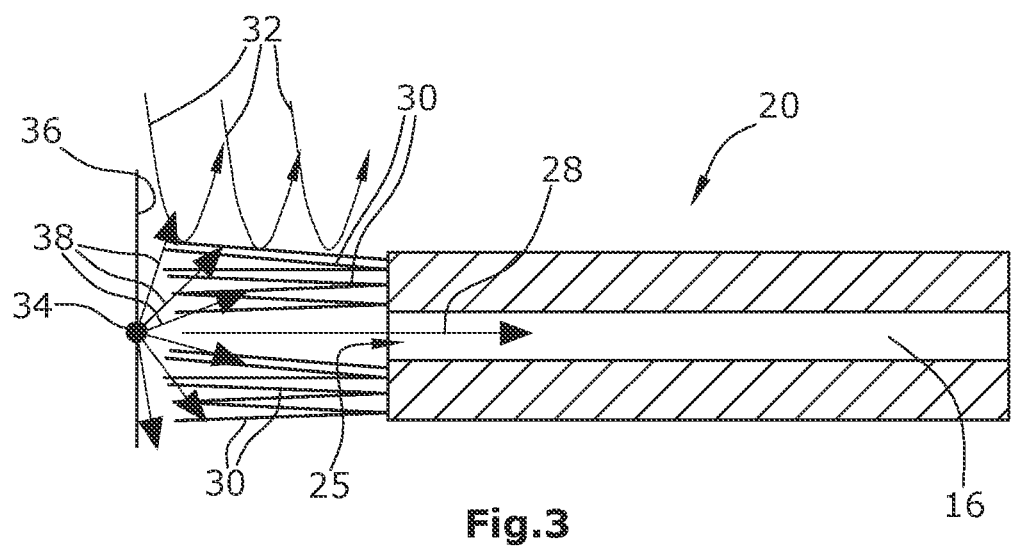
FIG. 3 is a longitudinal section through a sniffer probe (second embodiment)
Figure 4:
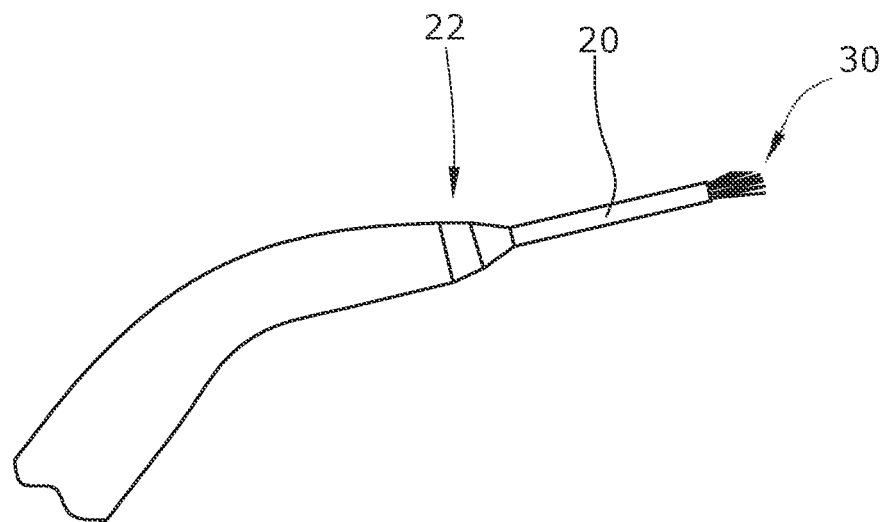
FIG. 4 is an illustration of the sniffer probe of FIG. 3.

While the first embodiment in FIGS. 1 and 2 is characterized by providing the sniffer tip 20 of a sniffer probe 22 with a sniffer attachment 12 having the elongated elements, the second embodiment in FIGS. 3 and 4 is based on the idea to attach the elongated elements directly to the sniffer tip 20. In the first embodiment a plurality of elongated elements is arranged in the region of the second intake opening 26 of the sniffer attachment 12 and extends beyond this second intake opening 26. In the second embodiment the elongated elements are arranged in the region of the first intake opening 25 of the sniffer tip 20 and extend distally beyond the same.

The elongated elements 30 form a barrier to transversal flows 32 directed transversally or almost transversally to the perpendicular bisector 28, the barrier being distributed annularly around the intake opening 26 and 25, respectively. The gas permeability of this barrier is significantly higher, and preferably maximal, in the longitudinal direction along the perpendicular bisector 28 and is significantly lower, and preferably negligibly low, for transversal flows 32 directed transversally to the perpendicular bisector 28.

FIGS. 1 and 3 schematically illustrate a leak 34 in the surface 36 to be sniffed, the star-shaped arrangement of arrows 38 indicating the test gas flowing from the leak 34. The elongated elements 30 avoid that transversal gas flows 32 carry the escaping test gas 38 away from the intake opening 26. When the elongated elements 30 contact the surface 36 to be sniffed in the region of the leak 34, the gas 38 escaping from the leak 34 is directed in the longitudinal direction along the perpendicular bisector 28 to the intake opening 26 or 25 and flows from there through the gas flow channel 16 to the gas analyzer for evaluation, the gas analyzer not being illustrated in the Figures.

The invention claimed is:

1. A sniffer probe of a gas analyzer, wherein the sniffer probe is configured to draw in a gas and is configured to be connected to the gas analyzer, the sniffer probe comprising:
   a sniffer tip comprising a cylindrical housing forming a cylindrical gas flow channel, wherein the sniffer tip comprises a first intake opening, such that gas is drawn in through the first intake opening along a perpendicular bisector of the first intake opening,
   wherein a distal end of the sniffer tip comprises a plurality of elongated gas-guiding elements arranged annularly on a distal end of the cylindrical housing around the first intake opening and protruding from the distal end distally beyond the first intake opening in a manner of a brush, to thereby form a barrier for transversal gas flows to prevent transversal gas flows from carrying the gas away from the first intake opening or being drawn into the first intake opening, and to reduce gas turbulences to increase a proportion of the gas in a gas flow drawn in to the first intake opening, thereby lowering a detection limit for detection of the gas, and
   wherein the plurality of elongated gas-guiding elements project from all the periphery of the first intake opening in an orientation that is inclined and not parallel with regard to the central main axis of the probe such that the plurality of elongated gas-guiding elements extend in front of the first intake opening, thereby covering the first intake opening to form a gas-permeable material that forms the barrier for transversal gas flows such that gas is detected along a perpendicular bisector to the first intake opening.

2. The sniffer probe of claim 1, wherein the plurality of elongated elements are elastic.

3. A sniffer attachment configured to be mounted to a sniffer tip of a sniffer probe of a gas analyzer, comprising:
   a cylindrical housing, wherein a proximal end of the cylindrical housing is connected to a distal tip of the sniffer tip;
   a second intake opening adapted to be aligned with a first intake opening of the sniffer tip, such that gas can be drawn in along a perpendicular bisector of both intake openings; and
   at a distal end of the sniffer attachment, a plurality of elongated gas-guiding elements arranged annularly around the second intake opening and protruding from the distal end distally beyond the second intake opening of the sniffer attachment in a manner of a brush, to thereby form a barrier for transversal gas flows to prevent transversal gas flows from carrying the gas away from the second intake opening or being drawn into the second intake opening, and to reduce gas turbulences to increase a proportion of the gas in a gas flow drawn in to the second intake opening, thereby lowering a detection limit for detection of the gas,
   wherein the plurality of elongated gas-guiding elements project from all the periphery of the second intake opening in an orientation that is inclined and not parallel with regard to the central main axis of the probe such that the plurality of elongated gas-guiding elements extend in front of the second intake opening, thereby covering the second intake opening to form a gas-permeable material that forms the barrier for transversal gas flows such that gas is detected along a perpendicular bisector to the second intake opening.

4. The sniffer probe of claim 3, wherein the plurality of elongated elements are elastic.

5. The sniffer probe of claim 3, wherein the plurality of elongated elements comprise a gas-permeable material covering the second intake opening or arranged adjacent the second intake opening.

6. A sniffer probe of a gas analyzer, wherein the sniffer probe is configured to draw in a gas and is configured to be connected to the gas analyzer, the sniffer probe comprising:
   a sniffer tip comprising a cylindrical housing forming a cylindrical gas flow channel, wherein the sniffer tip comprises a first intake opening, such that gas is drawn in through the first intake opening along a perpendicular bisector of the first intake opening, and
   wherein a distal end of the sniffer tip comprises an elongated gas-guiding element comprising a gas permeable material covering the first intake, to thereby form a barrier for transversal gas flows to prevent transversal gas flows from carrying the gas away from the first intake opening or being drawn into the first intake opening, and to reduce gas turbulences to increase a proportion of the gas in a gas flow drawn in to the first intake opening, thereby lowering a detection limit for detection of the gas, and
   wherein the elongated gas-guiding element projects from all the periphery of the first intake opening in an orientation that is inclined and not parallel with regard to the central main axis of the probe such that the elongated gas-guiding element extends in front of the first intake opening, thereby covering the first intake opening to form a gas-permeable material that forms the barrier for transversal gas flows such that gas is detected along a perpendicular bisector to the first intake opening.

7. A sniffer attachment configured to be mounted to a sniffer tip of a sniffer probe of a gas analyzer, comprising:
   a cylindrical housing, wherein a proximal end of the cylindrical housing is connected to a distal tip of the sniffer tip;
   a second intake opening adapted to be aligned with a first intake opening of the sniffer tip, such that gas can be drawn in along a perpendicular bisector of both intake openings; and
   at a distal end of the sniffer attachment, an elongated gas-guiding element comprising a gas permeable material covering the second intake opening, to thereby form a barrier for transversal gas flows to prevent transversal gas flows from carrying the gas away from the second intake opening or being drawn into the second intake opening, and to reduce gas turbulences to increase a proportion of the gas in a gas flow drawn in to the second intake opening, thereby lowering a detection limit for detection of the gas,
   wherein the elongated gas-guiding element projects from all the periphery of the second intake opening in an orientation that is inclined and not parallel with regard to the central main axis of the probe such that the elongated gas-guiding element extends in front of the second intake opening, thereby covering the second intake opening to form a gas-permeable material that forms the barrier for transversal gas flows such that gas is detected along a perpendicular bisector to the second intake opening.

* * * * *